United States Patent
Mark et al.

(10) Patent No.: US 8,943,233 B1
(45) Date of Patent: Jan. 27, 2015

(54) LINK NEGOTIATION METHOD FOR ENABLING COMMUNICATION BETWEEN SERIAL ATTACHED SMALL COMPUTER INTERFACE (SAS) STORAGE DEVICES

(71) Applicant: PMC-Sierra US, Inc., Sunnyvale, CA (US)

(72) Inventors: Cindy Mark, Coquitlam (CA); Brett Clark, Orefield, PA (US); Mathieu Gagnon, Verdun (CA); Atit Patel, Breinigsville, PA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/829,367

(22) Filed: Mar. 14, 2013

Related U.S. Application Data

(60) Provisional application No. 61/767,936, filed on Feb. 22, 2013.

(51) Int. Cl.
| | | |
|---|---|---|
| G06F 3/00 | (2006.01) | |
| G06F 13/12 | (2006.01) | |
| G06F 13/38 | (2006.01) | |
| G06F 13/00 | (2006.01) | |
| G06F 13/10 | (2006.01) | |

(52) U.S. Cl.
CPC ..................................... G06F 13/10 (2013.01)
USPC .............................. 710/10; 710/74; 710/110

(58) Field of Classification Search
CPC .......... G06F 3/00; G06F 13/00; G06F 12/00; G06F 13/38; H04L 12/28
USPC ............................................ 710/74, 110, 10
See application file for complete search history.

(56) References Cited

U.S. PATENT DOCUMENTS

| 4,995,083 | A | 2/1991 | Baker et al. | |
|---|---|---|---|---|
| 2006/0221985 | A1* | 10/2006 | Mishra | 370/401 |
| 2006/0294269 | A1* | 12/2006 | Duerk et al. | 710/62 |
| 2007/0226414 | A1* | 9/2007 | Holland et al. | 711/114 |
| 2008/0177946 | A1* | 7/2008 | Cherian et al. | 711/114 |
| 2008/0228941 | A1 | 9/2008 | Popescu et al. | |
| 2009/0087195 | A1 | 4/2009 | Schwandner et al. | |
| 2011/0289233 | A1* | 11/2011 | Dickens et al. | 709/236 |
| 2011/0302471 | A1 | 12/2011 | Le-Gall | |
| 2012/0233399 | A1* | 9/2012 | Kurokawa et al. | 711/114 |

* cited by examiner

*Primary Examiner* — Farley Abad
(74) *Attorney, Agent, or Firm* — Dennis R. Haszko

(57) ABSTRACT

A link negotiation method for enabling communication between first and second Serial Attached Small Computer Interface (SAS) storage devices operably coupled by an optical cable. The method includes continuously transmitting a non-SAS data pattern between the first and second SAS storage devices. In response to successful exchange of the non-SAS data between the first and second SAS storage devices, a SAS data pattern is continuously transmitted between the first and second SAS storage devices. In response to successful exchange of the SAS data pattern between the first and second SAS storage devices, an initial frame is continuously transmitted between the first and second SAS storage devices. Communication between the first and second SAS storage devices is enabled in response successful communication of the initial frame between the first and second SAS storage devices.

20 Claims, 6 Drawing Sheets

LINK NEGOTIATION METHOD FOR ENABLING COMMUNICATION BETWEEN SERIAL ATTACHED SMALL COMPUTER INTERFACE (SAS) STORAGE DEVICES

CROSS REFERENCE TO RELATED APPLICATIONS

This application claims the benefit of priority of U.S. Provisional Patent Application No. 61/767,936 filed Feb. 22, 2013 which is incorporated herein by reference in its entirety.

FIELD

The present disclosure relates to a link negotiation method for enabling communication between storage network devices that are connected by optical cables and utilize the Serial Attached Small Computer System Interface (SAS) protocol to transmit data between the storage network elements, and a system for performing the same.

BACKGROUND

In the field of network storage devices, the SAS protocol is a serial connection protocol utilized to transfer digital data between network storage elements (hereinafter referred to as SAS storage devices). The SAS protocol requires that a link negotiation method be performed before communication is enabled between SAS storage devices. The link negotiation method: establishes the presence of other SAS storage devices; and synchronizes SAS storage devices so that communication is enabled between SAS storage devices within a controlled period of time.

Such a link negotiation method also facilitates the return of a SAS storage device to an initial reset state when communication between SAS storage devices fails. This helps ensure that the SAS storage devices are synchronized (i.e. two SAS storage devices have communication enabled or neither SAS storage device has communication enabled). Initiation of the link negotiation method by one SAS storage device will induce another SAS storage device to also initiate the link negotiation method.

The link negotiation method described in version 2.0 of the SAS protocol is suitable for SAS storage devices that are connected by electrical cables, but is unsuitable for enabling communication between SAS storage devices that are connected by optical cables because it utilizes a direct current (D.C.) idle electrical state that cannot be represented by a light pulse.

The link negotiation method described in version 2.1 of the SAS protocol provides a link negotiation method that is suitable for SAS storage devices that are connected by optical cables. The link negotiation method described in version 2.1 of the SAS protocol replaces every instance of a D.C. idle electrical state of the link negotiation method described in version 2.0 of the SAS protocol with a distinctive data pattern that is not previously defined in version 2.0 of the SAS protocol. The link negotiation method described in version 2.1 of the SAS protocol, however, is incapable of enabling communication with legacy SAS storage devices that utilize the link negotiation method described in version 2.0 of the SAS protocol to enable communication.

Improvements in link negotiation methods for enabling communication between SAS storage devices that are connected by optical cables and utilize the SAS protocol to transfer digital data between SAS storage devices are therefore desirable.

BRIEF DESCRIPTION OF THE DRAWINGS

Embodiments of the present disclosure will be described, by way of example, with reference to the drawings and to the following description, in which.

DETAILED DESCRIPTION OF THE PREFERRED EMBODIMENTS

Figure 1:
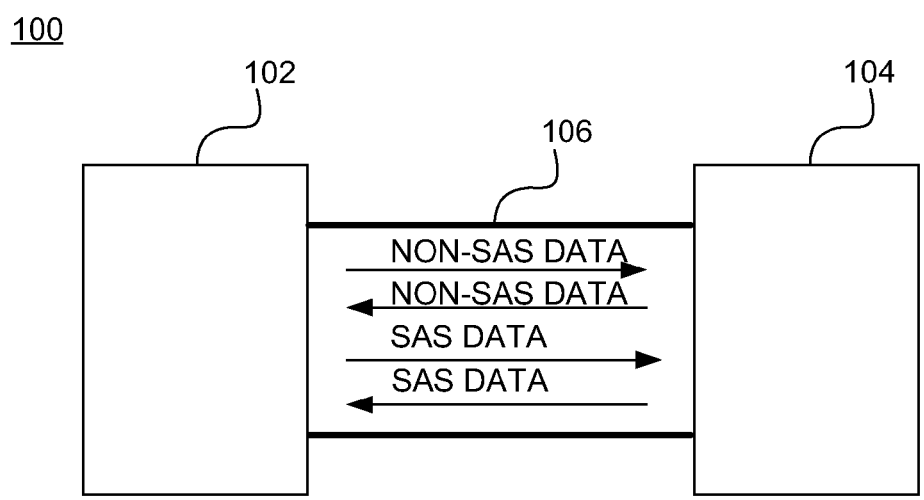
FIG. 1 is a block diagram of a SAS system in accordance with an embodiment of the present disclosure.

According to an aspect, the present disclosure provides a link negotiation method for enabling communication between a first Serial Attached Small Computer System Interface (SAS) storage device and a second SAS storage device, the second SAS storage device being operably coupled to the first SAS storage device by an optical cable. The link negotiation method includes: continuously transmitting a non-SAS data pattern suitable for transmission on the optical cable between the first SAS storage device and the second SAS storage device; in response to successful exchange of the non-SAS data pattern between the first SAS storage device and the second SAS storage device, continuously transmitting a SAS data pattern between the first SAS storage device and the second SAS storage device; in response to successful exchange of the SAS data pattern between the first SAS storage device and the second SAS storage device, continuously transmitting an initial frame between the first SAS storage device and the second SAS storage device; and establishing communication between the first SAS storage device and the second SAS storage device in response to successful communication of an initial frame between the first SAS storage device and the second SAS storage device, to enable transmission of data between the first and second SAS storage dives utilizing the SAS protocol.

In an aspect, the non-SAS data pattern comprises a pseudorandom bit sequence (PRBS) data pattern, suitable for transmission over the optical cable.

In an aspect, the initial frame comprises an SAS identify frame.

In an aspect, the initial frame comprises a serial ATA (SATA) device-to-host frame information structure.

In an aspect, the first SAS storage device is a master, and successful exchange of the non-SAS data pattern includes receipt, at the first SAS storage device, of the transmitted non-SAS data pattern.

In an aspect, the first SAS storage device is a master, and successful exchange of the SAS data pattern includes expiry of a timer.

In an aspect, the first SAS storage device is a master, and successful exchange of the SAS data pattern comprises receipt, at the first SAS storage device, of the SAS data pattern or expiry of a second timer.

In an aspect, the second SAS storage device is a slave, and successful exchange of the non-SAS data pattern is performed in response to receipt, at the second SAS storage device, of the non-SAS data pattern.

In an aspect, the second SAS storage device is a slave and successful exchange of the SAS data pattern comprises receipt, at the second SAS storage device, of the SAS data pattern.

In an aspect, the present disclosure provides a computer-readable medium having computer-readable instructions executable by at least one processor to perform a link negotiation method as described herein.

Embodiments of the present disclosure generally relate to a link negotiation method for enabling communication between SAS storage devices that are connected by an optical cable and utilize the SAS protocol to transfer digital data between SAS storage devices, and a system for performing the same. The SAS standard expects that SAS storage devices may perform simultaneous transmission and reception of data. Therefore, each SAS device at a minimum includes a transmitter and receiver pair. Each such transmitter/receiver pair is referred to as a SAS phy. Communication between SAS storage devices is achieved using one or more SAS phys.

The link negotiation method of the present disclosure is comprised of a particular handshaking sequence between SAS storage devices via the exchange of data. The link negotiation method of the present disclosure includes continuously transmitting a non-SAS data pattern between the SAS storage devices, and then continuously transmitting a SAS data pattern between the SAS data storage devices. The SAS storage devices must successfully exchange a non-SAS data pattern before transmitting the SAS data pattern. After successfully exchanging the SAS data pattern, the SAS storage devices are permitted to exchange the SAS identify frame. Communication between SAS storage devices is then enabled in response to the successful exchange of an identify frame as described by the SAS standard.

A successful exchange or handshake, as referred to herein, is defined as transmitting a predefined data pattern from one SAS storage device to another SAS storage device, and receiving an expected data response within a predetermined period of time. An unsuccessful exchange or handshake, as referred to herein, is defined as transmitting a predefined data pattern from one SAS storage device to another SAS storage device, but not receiving the expected data response within a predetermined period of time.

The term SAS data pattern refers herein to an SAS encoded bit stream that is transmitted by a SAS storage device. The term SAS data frame refers to data that is transferred between SAS storage devices via the SAS protocol.

A non-SAS data pattern refers herein to a data pattern that is entirely distinct from a SAS data pattern specified in the SAS protocol. A non-SAS data pattern that is suitable for the link negation method of the present disclosure has three distinct characteristics. The first characteristic is that the non-SAS data pattern has ones and zeros that alternate pseudo randomly in the data pattern. This helps prevent the increase of electromagnetic interference (EMI) in a SAS storage device. The second characteristic is that the length of continuous ones or zeros in the non-SAS data pattern is controllable. This renders the non-SAS data pattern suitable for transmission over an optical cable. The third characteristic is that the pattern be recognizable/identifiable by a receiver. An example of a non-SAS data pattern is a pseudo random binary sequence. Another example of a non-SAS data pattern is a custom designed data pattern that exhibits the above-noted two characteristics for a non-SAS data pattern.

A SAS storage device implements either a master state machine or a slave state machine. Both a master and a slave state machine are described in the present disclosure. The master and slave state machines describe the expected behaviour of a SAS storage device in order to perform the link negotiation method described in the present disclosure.

In an embodiment of the link negotiation method of the present disclosure, two SAS storages device are connected together. Both SAS storage devices are permitted to initiate transitions in the data stream, for example from transmitting a non-SAS data pattern to transmitting a SAS data pattern. Such a link negotiation would occur if two SAS storage devices, both implementing the master state machine, are connected together. In an alternative embodiment of the link negotiation method of the present disclosure, only one SAS storage device is permitted to initiate transitions in the data stream. Such a link negotiation would occur if one SAS storage device implementing the master state machine and another SAS storage device implementing the slave state machine are connected together.

In another embodiment of the link negotiation method of the present disclosure, when loss of SAS communication is detected, a SAS storage device will return to transmitting a non-SAS data pattern. The return to transmitting a non-SAS data pattern causes another SAS storage device that is connected to the SAS storage device to also return to transmitting a non-SAS data pattern, thereby returning both SAS storage devices to the initial state, and readying them for another link negotiation.

Figure 3:
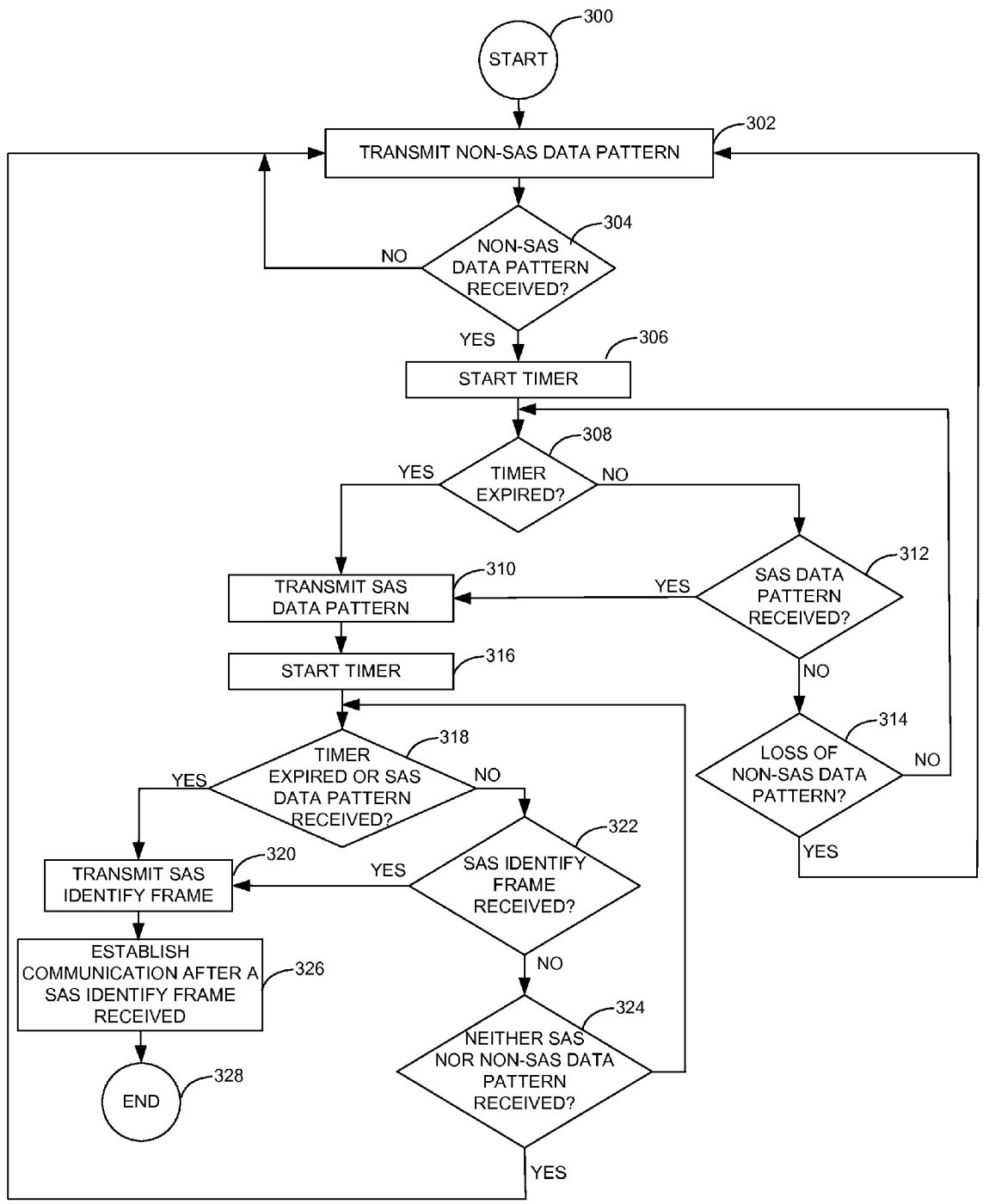
FIG. 3 is flowchart of actions performed by a master state machine that is implemented in a SAS storage device for performing the link negotiation method of FIG. 2.

The term master state machine is utilized herein to refer to an implementation of the flowchart illustrated in FIG. 3 in a SAS storage device. The master state machine permits the initiation of changes in the transmitted data stream upon the expiration of timers as well as in response to the received data stream. The term slave state machine is utilized herein to refer to the implementation of the flowchart illustrated in FIG. 4 in a SAS storage device. The slave state machine only permits changes in the transmitted data stream in response to the received data stream.

The term asymmetric link negotiation is utilized herein to refer to a link negotiation where one SAS storage device, which implements a master state machine, is connected to another SAS storage device, which implements a slave state machine. The term symmetric link negotiation refers is utilized herein to refer to a link negotiation between two SAS storage devices where both SAS storage devices implement a master state machine.

A feature of all versions of the SAS protocol is that during link negotiation, each SAS storage device sends an initial data frame (otherwise referred to as a SAS identify frame) to another SAS storage device. An SAS identify frame must be received by a SAS storage device prior to 1 ms after transmission of the SAS identify frame. The link negotiation method of the present disclosure ensures that both devices will transmit a SAS identify frame within a predefined period of each other in a successful link negotiation. Further, the link negotiation method of the present disclosure ensures that loss of communication or reset on one of the SAS storage device is communicated quickly to another SAS storage device to abort any pending data transfers between the SAS storage device and to prevent corruption in the data being transferred.

Referring to FIG. 1, a block diagram of an SAS system 100 is shown. The SAS system 100 includes a first SAS storage device 102 and a second SAS storage device 104 that are operably coupled by an optical cable 106. Digital data, including non-SAS data and SAS data is continuously transferred between the first and second storage devices 102, 104 over the optical cable 106.

Figure 2:
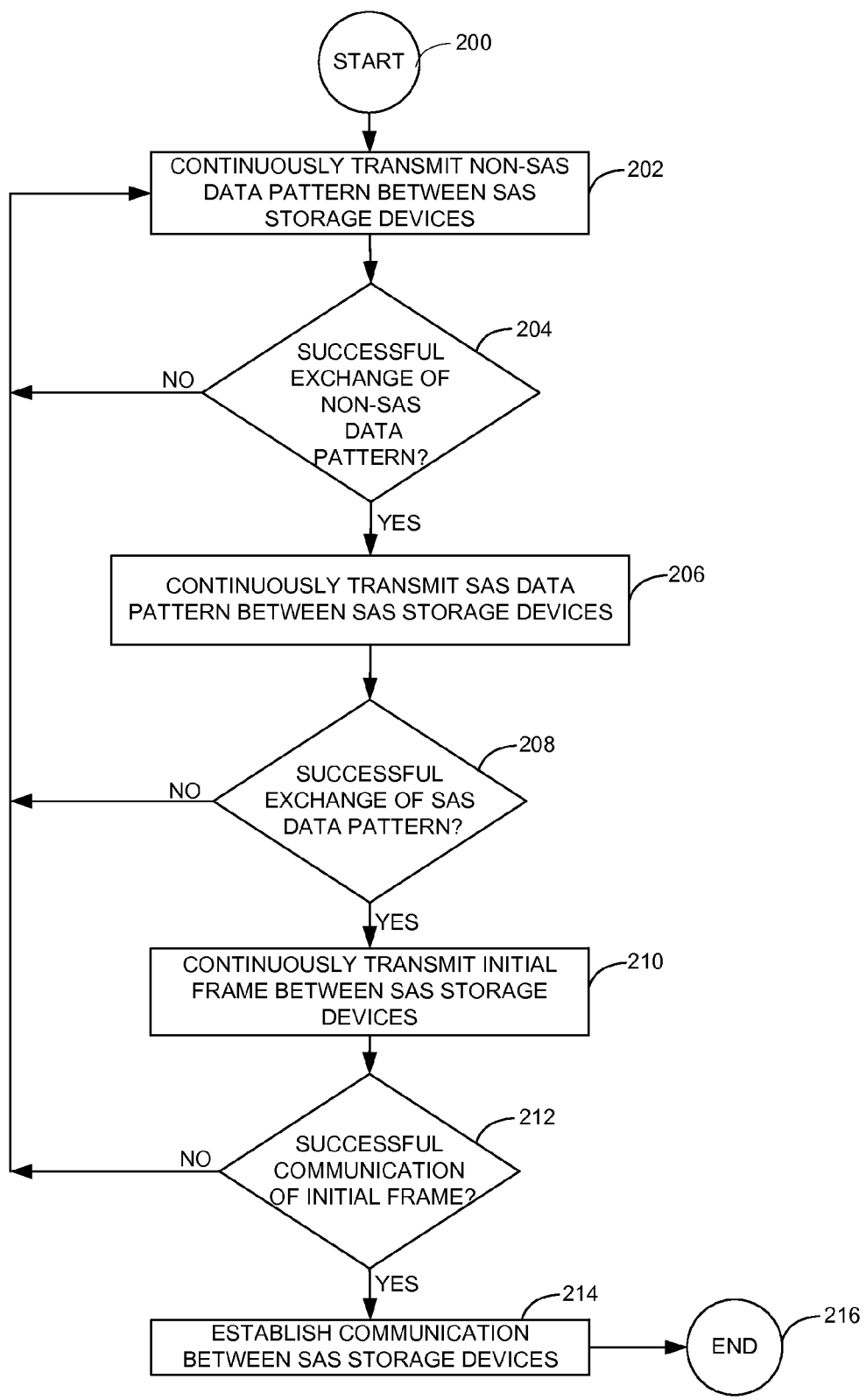
FIG. 2 is flowchart illustrating a link negotiation method in accordance with an embodiment of the present disclosure.

A flowchart illustrating an embodiment of a link negotiation method for enabling communication between SAS storage devices is shown in FIG. 2.

The link negotiation method begins 200 by continuously transmitting 202 a non-SAS data pattern between the first SAS storage device 102 and the second SAS storage device 104. In response to successfully exchanging 204 the non SAS data pattern between the first and second SAS storage devices 102, 104, the link negotiation method proceeds to continuously transmit 206 a SAS data pattern between the first SAS storage device 102 and the second SAS storage device 104. In response to not successfully exchanging 204 the non SAS data pattern between the first and second SAS storage devices 102, 104, the link negotiation method returns to 200.

In response to successfully exchanging 208 the SAS data pattern between the first and second SAS storage devices 102, 104, the link negotiation method proceeds to continuously transmit 210 an initial frame between the first and second SAS storage devices 102, 104. The initial frame may be a SAS identify frame or a serial ATA (SATA) D2H (device-to-host) frame information structure (FIS). In response to not successfully exchanging 208 the SAS data pattern between the first and second SAS storage devices 102, 104, the link negotiation method returns to 200.

In response to successfully communicating 212 an initial frame, the link negotiation method proceeds to establish communication 214 between the first SAS storage device 102 and the second SAS storage device 104. In an example embodiment, the initial frame communicated in 212 comprises a SAS identify frame. When communication is established 214, SAS data frames or SATA data frames may be transmitted between the first and second SAS storage devices 102, 104. In response to not successfully communicating 212, the link negotiation method returns to 200.

The link negotiation method of the present disclosure requires that data be continuously transmitted by both the first SAS storage device 102 and the second SAS storage device 104 because of the requirements of the optical cable. The first SAS storage device 102 must switch between transmitting SAS data patterns and transmitting non-SAS data such that there is no gap, for example no D.C. idles, between the SAS data pattern and the non-SAS data (i.e. no period of D.C. idle between the two patterns). The switch between transmitting the SAS data patterns and transmitting the non-SAS data is not required to occur on a SAS dword boundary.

Transmission and recognition of a non-SAS data pattern, is often added to SAS storage devices to perform characterization of the SAS storage devices' data receivers.

The receivers of the first and second SAS devices 102, 104 may search for non-SAS data synchronization (i.e. successful exchange of a non-SAS data pattern between the first and second SAS storage devices 102, 104), and SAS data synchronization (i.e. successful exchange of a SAS data pattern between the first and second SAS storage devices 102, 104) simultaneously. A person of ordinary skill in the art, however, would readily recognize that the link negotiation method of the present disclosure may be adapted to alternately search for each non-SAS data and SAS data pattern in sequence.

The characteristics of the receiver of the first and second SAS storage devices 102, 104, and the implementation of the first and second SAS storage devices 102, 104, should be known for implementation of the first and second SAS storage devices 102, 104. A person of ordinary skill in the art would therefore understand how to appropriately set the timers for the master state machine and the slave state machine.

FIG. 3 illustrates a master state machine that is implemented in a SAS storage device for performing the link negotiation method of the present disclosure. The blocks in the flowchart shown in FIG. 3 represent the states of the master state machine, and the conditions for transitioning between states of the master state machine.

The master state machine may be implemented in a SAS storage device utilizing software or firmware. The software or firmware may be executed by, for example, a processor that is part of a SAS storage device. Coding of software or firmware for implementing the master state machine in a SAS storage device is within the scope of a person of ordinary skill in the art given the present disclosure. Computer-readable code executable by a processor that forms part of a SAS storage device implements the master state machine and may be stored in a computer-readable medium. Alternatively, the master state machine may be implemented in a SAS storage device utilizing hardware (e.g. a field programmable gate array (FPGA) or custom logic in an application specific integrated circuit (ASIC)).

In the embodiment shown in FIG. 3, a master state machine is implemented in the first SAS storage device 102. A master state machine is also implemented in the second SAS storage device 104 that is connected to the first SAS storage device 102 by the optical cable 106. Thus, a symmetric link negotiation is performed between the first SAS storage device 102 and the second SAS storage device 104. The first SAS storage device 102 is started independently from the second SAS storage device 104. Thus, when the master state machine that is implemented in the first SAS storage device 102 is in a state represented by block 302, the master state machine that is implemented in the second SAS storage device 104 may be in either the state represented by 302, the state represented by 302 or 306, for example. For the sake of clarity, only the states and state transitions from the point of view of the master state machine implemented in the first SAS storage device 102 are described.

The master state machine begins at 300 and continuously transmits at 302 a non-SAS data pattern from the first SAS storage device 102. After the master state machine continuously transmits at 302 a non-SAS data pattern, the master state machine transitions to 304 to determine if the master state machine has received a non-SAS data pattern.

If the master state machine has received a non-SAS data pattern at 304, the master state machine transitions to 306 and the master state machine starts a timer in the first SAS storage device 102. If the master state machine does not receive a non-SAS data pattern at 304, the master state machine transitions to 302 to continuously transmit a non-SAS data pattern from the first SAS storage device 102.

After the timer is started at 306, the master state machine transitions to 308 to determine if the timer has expired. If the master state machine determines at 308 that the timer expired, the master state machine transitions to 310 and a SAS data pattern is transmitted from the first SAS storage device 102. If the master state machine determines at 308 that the timer has not expired, the master state machine transitions to 312 to determine if the SAS storage device 102 has received a SAS data pattern from the second SAS storage device 104.

If the master state machine determines at 312 that the first SAS storage device 102 has received a SAS data pattern from the SAS storage device 104, the master state machine transitions to 310 to transmit a SAS data pattern from the first SAS storage device 102. If the master state machine determines at 312 that the first SAS storage device 102 has not received a SAS data pattern from the second SAS storage device 104, the master state machine state transitions to 314 to determine if the receiver(s) of the first SAS storage device 102 have lost reception of non-SAS data pattern.

If the master state machine determines at 314 that the receiver(s) of the first SAS storage device 102 has lost reception of the non-SAS data pattern, the master state machine transitions to 302 to continuously transmit the non-SAS data pattern from the first SAS storage device 102. If the master state machine determines at 314 that the receiver(s) of the first SAS storage device 102 has not lost reception of the non-SAS data pattern, the master state machine transitions to 308.

After the master state machine transmits at 310 a SAS data pattern from the first SAS storage device 102, the master state machine transitions to 316 and the master state machine starts a timer in the first SAS storage device 102. After the timer is started at 316, the master state machine transitions to 318 to determine if the timer has expired, or if a SAS data pattern has been received by the first SAS storage device 102. If the master state machine determines at 318 that the timer expired or that a SAS data pattern has been received by the first SAS storage device 102, the master state machine transitions to 320 and a SAS identify frame is transmitted from the first SAS storage device 102. If the master state machine determines at 318 that the timer has not expired, or that a SAS data pattern has not been received by the first SAS storage device 102, the master state machine transitions to 322 to determine if the first SAS storage device 102 has received a SAS identify frame from the second SAS storage device 104.

If the master state machine determines at 322 that the first SAS storage device 102 has received a SAS identify frame from the SAS storage device 104, the master state machine transitions to 320 to transmit a SAS identify frame from the first SAS storage device 102. If the master state machine determines at 322 that the first SAS storage device 102 has not received a SAS identify frame from the second SAS storage device 104, the master state machine state transitions to 324 to determine if the receiver(s) of the first SAS storage device 102 has received a non-SAS data pattern or a SAS data pattern.

If the master state machine determines at 324 that the receiver(s) of the first SAS storage device 102 has received neither a non-SAS data pattern nor a SAS data pattern, the master state machine transitions to 302 to continuously transmit a non-SAS data pattern from the first SAS storage device 102. If the master state machine determines at 324 that the receiver(s) of the first SAS storage device 102 has received a non-SAS data pattern or a SAS data pattern, the master state machine transitions to 318.

After the master state machine transmits a SAS identify frame from the first SAS storage device 102 at 320, the master state machine transitions to 326 and establishes communication between the first SAS storage device 102 and the second SAS storage device 104 after a SAS identify frame is received. Once communication is established between the first and second SAS storage devices 102, 104, the link negotiation method ends at 328, and data is transmitted between first and second SAS storage devices 102, 104 in accordance with the SAS protocol.

The size of the timer in the first SAS storage device 102 that is started by the master state machine at 306 is determined, for example, by the characteristics of the non-SAS data receiver of SAS storage device 104, and the speed that events are handled by SAS storage device 104. In an example embodiment, the time duration of error free data required 104 to identify a non-SAS data pattern in the data received by the second SAS storage device 104 is x, and the time required for 104 to handle this event is y. To ensure that the second SAS storage device 104 identifies and responds to the non-SAS data pattern transmitted by the first SAS storage device 102, the timer that is in the first SAS storage device 102 and is started by the master state machine must be set to be >x+y.

The size of the timer in the first SAS storage device 102 that is started by the master state machine at 316 is determined, for example, by the characteristics of the SAS data receiver of the second SAS storage device 104, and the speed that events are handled by the second SAS storage device 104. In an example embodiment, the time required for the second SAS storage device 104 to declare SAS data pattern synchronization (i.e. successful exchange of a SAS data pattern) is m and the time required to handle the synchronization event is n. Some additional time must also be added for the first SAS storage device 102 to recognize the incoming SAS data pattern so that the master state machine does not immediately return back to 202. Let this time be p. The timer the timer that is in the first SAS storage device and is started by the master state machine must therefore be at least >m+n+p. As SAS receivers may only gain synchronization on certain SAS data patterns as defined by the SAS protocol, the composition of the SAS data pattern transmitted by the first SAS storage device 102 may be adjusted to reduce the minimum size of the timer in the first SAS storage device 102 that is started by the master state machine at 316. Alternatively, the SAS storage devices' receiver's requirements for synchronizing on the SAS data pattern on the second SAS storage device 104 may be adjusted to reduce the minimum size of the timer in the first SAS storage device 102 that is started by the master state machine in 316.

Figure 4:
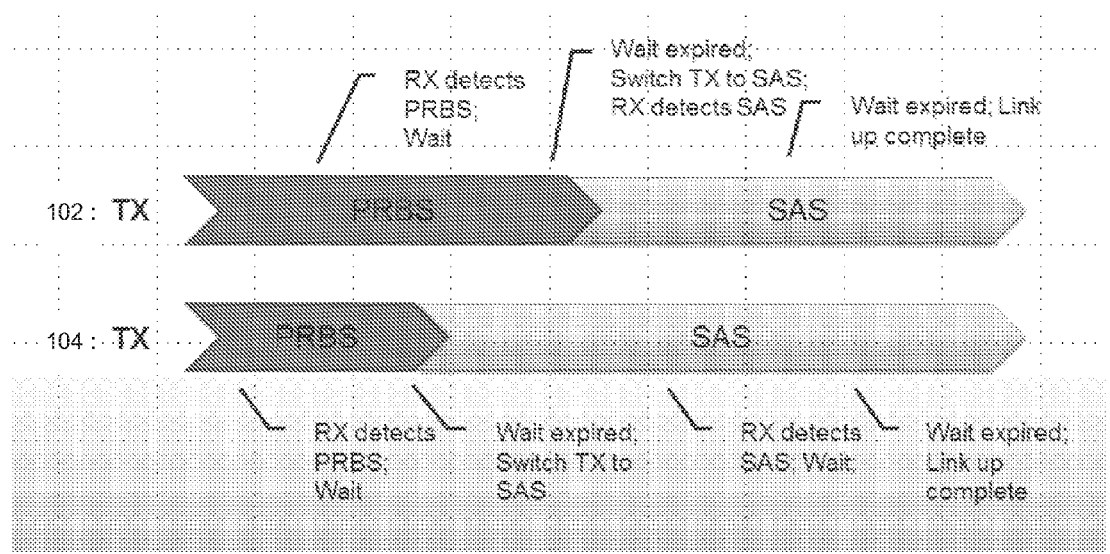
FIG. 4 illustrates an example of the exchange of data when a SAS storage device implements a master state machine is connected to another SAS storage device that implements a master state machine.

FIG. 4 illustrates data transferred between the first and second SAS storage devices 102, 104, over the optical cable 106, for the symmetric link negotiation described above with reference to FIG. 3.

Figure 5:
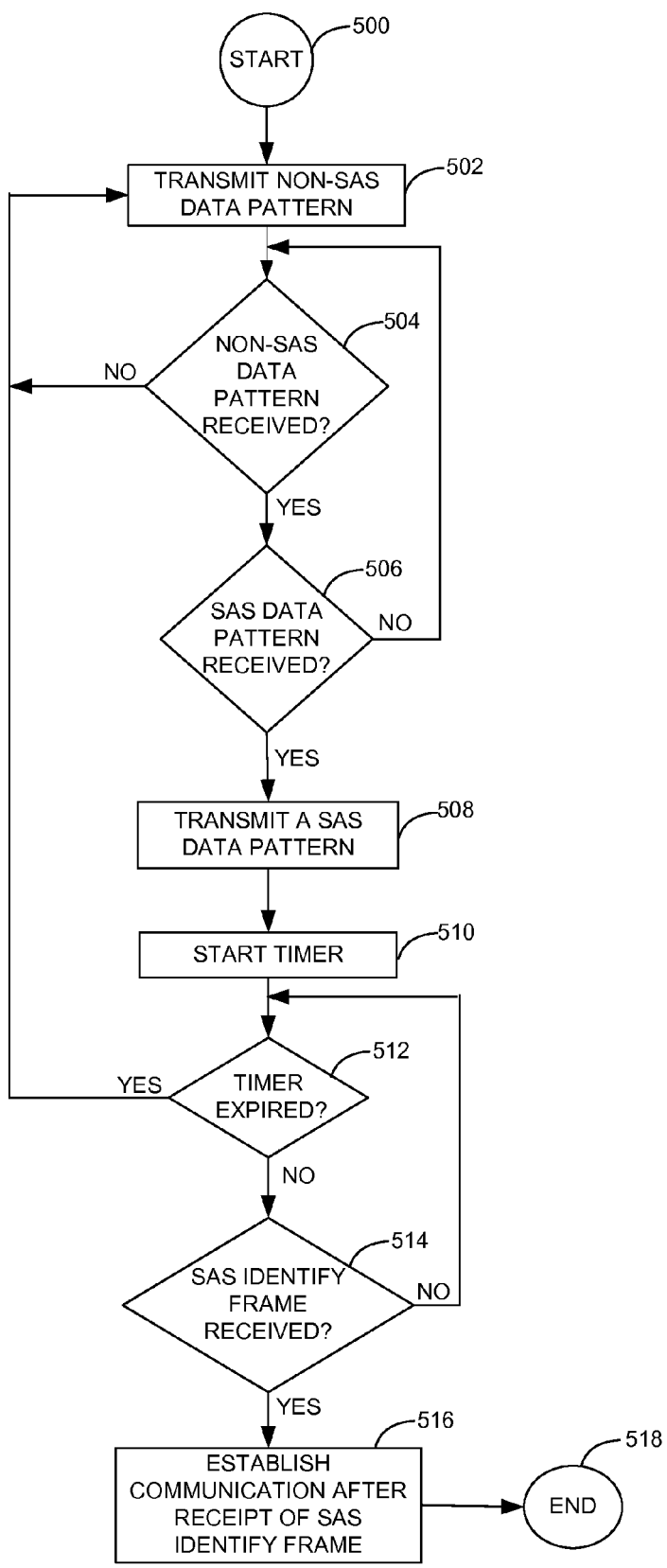
FIG. 5 is flowchart of actions performed by a slave state machine that is implemented in a SAS storage device for performing link negotiation method of FIG. 2.

FIG. 5 illustrates a slave state machine that is implemented in a SAS storage device for performing the link negotiation method of the present disclosure. The blocks in the flowchart shown in FIG. 5 represent the states of the slave state machine, and the conditions for transitioning between states of the slave state machine.

The slave state machine may be implemented in a SAS storage device utilizing software or firmware. The software or firmware may be executed by, for example, a processor that is part of a SAS storage device. Coding of software or firmware for implementing the master state machine in a SAS storage device is within the scope of a person of ordinary skill in the art given the present disclosure. Computer-readable code executable by a processor that forms part of a SAS storage device implements the master state machine and may be stored in a computer-readable medium. Alternatively, the slave state machine may be implemented in a SAS storage device utilizing hardware (e.g. a field programmable gate array (FPGA) or custom logic in an application specific integrated circuit (ASIC)).

In the embodiment shown in FIG. 5 the slave state machine is implemented in the second SAS storage device 104. A master state machine is implemented in the first SAS storage device 102. The first SAS storage device 104 is connected to the second SAS storage device 104 by the optical cable 106. Thus, an asymmetric link negotiation is performed between the first SAS storage device 102 and the SAS storage device 104. The following description of an asymmetric link negotiation is the point of view of second SAS storage device 104. For the sake of clarity, only the states and the state transitions from the point of view of slave state machine implemented in the second SAS storage device 104 are described.

The slave state machine begins at 500 and continuously transmits at 502 a non-SAS data pattern from the second SAS storage device 104. After the slave state machine continuously transmits a non-SAS data pattern at 502, the slave state machine transitions to 504 to determine the second SAS storage device 104 has received a non-SAS data pattern from the first SAS storage device 102.

If the slave state machine has received a non-SAS data pattern at 504, the slave state machine transitions to 506 to determine if the second SAS storage device 104 has received a SAS data pattern from the first SAS storage device 102. If the slave state machine has not received a non-SAS data pattern at 504, the slave state machine transitions to 502.

If the second SAS storage device 104 has received a SAS data pattern from the first SAS storage device 102, the slave state machine transitions to 508 to transmit a SAS data pattern. If the second SAS storage device 104 has not received a SAS data pattern from the first SAS storage device 102, the slave state machine transitions to 504.

After the slave state machine transmits a SAS data pattern from the second SAS storage device 104 at 508, the slave state machine transitions to 510 and the slave state machine starts a timer in the second SAS storage device 104. After the timer is started at 510, the slave state machine transitions to 512 to determine if the timer has expired.

If the slave state machine determines at 512 that the timer expired, the slave state machine transitions to 502. If the master state machine determines at 512 that the timer has not expired, the slave state machine transitions to 514 to determine if the second SAS storage device 102 has received SAS identify frame.

If the slave machine determines at 514 that the second SAS storage device 104 has received a SAS identify frame from the first SAS storage device 102, the slave state machine transitions to 516 to establish communication between the second SAS storage device 104 and the first SAS storage device 102. The slave state machine only establishes communication after a SAS identify frame is received by the second SAS storage device. If the slave state machine determines at 514 that the second SAS storage device 104 has not received a SAS identify frame from the first SAS storage device 102, the slave state machine state transitions to 512.

It is important to ensure that the slave state machine in FIG. 5 checks first for the non-SAS data pattern before searching for the SAS data pattern in order to ensure that both the first and second SAS storage devices 102,104 successfully exchange the non-SAS data pattern (or handshake on the non-SAS data pattern). This requirement is important for the link recovery to occur properly.

The timer in the second SAS storage device 104 that is started by the slave state machine at 510 may be sized in an analogous manner to the timer in the first SAS storage device 102 that is started by the master state machine at 316.

Figure 6:
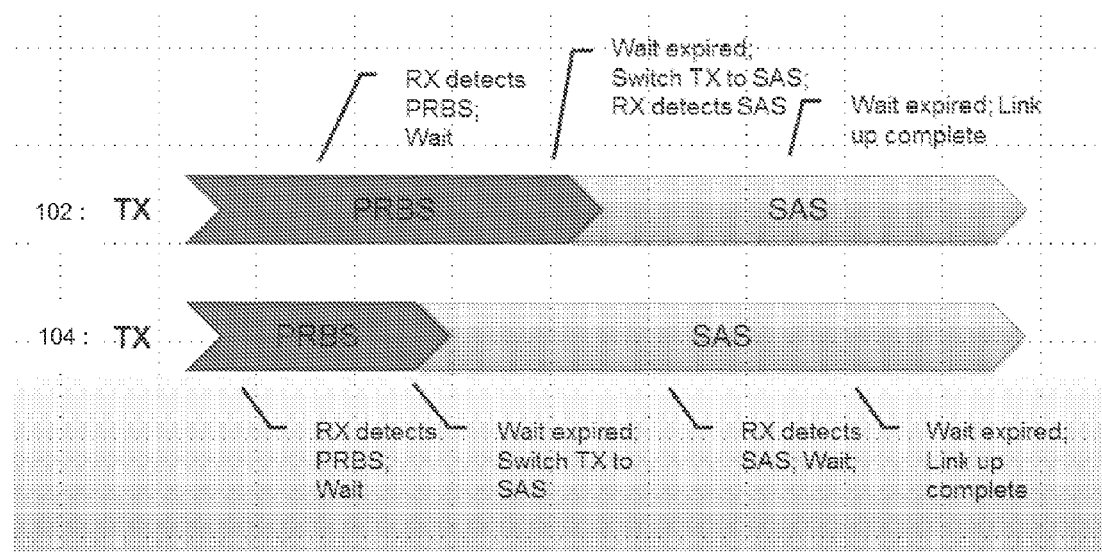
FIG. 6 illustrates an example of the exchanged of data when a SAS storage device that implements a master state machine is connected to another SAS storage device that also implements a slave state machine.

FIG. 6 illustrates data transferred between the first and second SAS storage devices 102, 104, over the optical cable 106, for the asymmetric link negotiation described above with reference to FIG. 5.

Advantageously, a link negotiation method of embodiments of the present disclosure is compatible with existing versions 2.0 and 2.1 of the SAS protocol. The link negotiation method of the present disclosure provides recovery loops so that SAS storage devices may be hotplugged. The data patterns transmitted by the link negotiation method of the present disclosure display pseudorandom characteristics to prevent the increase of electromagnetic interference (EMI) and are therefore suitable for transmission over an optical cable. The link negotiation method of the present disclosure, however, does not allow rate negotiation. Each SAS storage device must be pre-programmed to the same data rate in order to reduce timing complexity.

Continuous transmission of the data provides several advantages. For a receiver of an SAS storage device to synchronize onto a non-SAS data pattern or SAS data pattern (i.e. successfully exchange a non-SAS data pattern or a SAS data pattern), a minimum amount of data must be received. The more data that is received, the more quickly the receiver is able to synchronize onto the incoming data pattern. In addition, continuous and immediate feedback about the state of the other SAS storage device enables the SAS storage device to respond quickly to changes the other SAS storage device's changes in state The continuous and immediate feedback is important for reset conditions. Further, by transmitting known data that is not an SAS data pattern, an SAS storage device is ensured to act upon loss of the link within a deterministic time.

The link negotiation method of the present disclosure is also simple and robust to timing variations in order to minimize processing requirements. The link negotiation method of the present disclosure does not require a dedicated processor to manage each SAS phy instance of a SAS storage device. By adjusting the timing boundaries on the maser and slave state machines, the master and slave state machines may be more or less tolerant to variation in event handling times.

In an alternative embodiment, the link negotiation method of the present disclosure may be utilized for SATA link negotiation. The method is similar to that shown in FIG. 2 with respect to 200-210, 214, and 216. In this alternative embodiment, the successful communication of an initial frame in 212 includes receiving, at one of the first SAS storage device or the second SAS storage device, a SATA device-to-host frame information structure.

Embodiments of the present disclosure may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A link negotiation method for enabling communication between a first Serial Attached Small Computer System Interface (SAS) storage device and a second SAS storage device, the second SAS storage device being operably coupled to the first SAS storage device by an optical cable, the method comprising:
  continuously transmitting a non-SAS data pattern suitable for transmission on the optical cable between the first SAS storage device and the second SAS storage device;
  in response to successful exchange of the non-SAS data pattern between the first SAS storage device and the second SAS storage device, continuously transmitting a SAS data pattern between the first SAS storage device and the second SAS storage device;
  in response to successful exchange of the SAS data pattern between the first SAS storage device and the second SAS storage device, continuously transmitting an initial frame between the first SAS storage device and the second SAS storage device; and
  establishing communication between the first SAS storage device and the second SAS storage device, in response to successful communication of the initial frame between the first SAS storage device and the second SAS storage device, to enable transmission of data between the first and second SAS storage devices utilizing the SAS protocol.

2. The link negotiation method of claim 1, wherein the non-SAS data pattern comprises a pseudorandom bit sequence (PRBS) data pattern suitable for transmission over the optical cable.

3. The link negotiation method of claim 1, wherein the initial frame comprises an SAS identify frame.

4. The link negotiation method of claim 1, wherein the initial frame comprises a serial ATA (SATA) device-to-host frame information structure.

5. The link negotiation method of claim 1, wherein the first SAS storage device is a master, and wherein successful exchange of the non-SAS data pattern comprises receipt, at the first SAS storage device, of the transmitted non-SAS data pattern.

6. The link negotiation method of claim 1, wherein the first SAS storage device is a master, and wherein successful exchange of the non-SAS data pattern comprises expiry of a first timer.

7. The link negotiation method of claim 1, wherein the first SAS storage device is a master and wherein successful exchange of the SAS data pattern comprises receipt, at the first SAS storage device, of the SAS data pattern or expiry of a second timer.

8. The link negotiation method of claim 1, wherein the second SAS storage device is a slave, and wherein successful exchange of the non-SAS data pattern is performed in response to receipt, at the second SAS storage device, of the non-SAS data pattern.

9. The link negotiation method of claim 1, wherein the second SAS storage device is a slave and successful exchange of the SAS data pattern comprises receipt, at the second SAS storage device, of the SAS data pattern.

10. The link negotiation method of claim 1, wherein the second SAS storage device is a slave, and wherein successful communication comprises receipt, at the second SAS storage device, of a SAS identify frame.

11. A non-transitory computer-readable medium having computer-readable instructions executable by at least one processor to perform a link negotiation method for enabling communication between a first Serial Attached Small Computer System Interface (SAS) storage device and a second SAS storage device, the second SAS storage device being operably coupled to the first SAS storage device by an optical cable, the method comprising:
  continuously transmitting a non-SAS data pattern suitable for transmission on the optical cable between the first SAS storage device and the second SAS storage device;
  in response to successful exchange of the non-SAS data pattern between the first SAS storage device and the second SAS storage device, continuously transmitting a SAS data pattern between the first SAS storage device and the second SAS storage device;
  in response to successful exchange of the SAS data pattern between the first SAS storage device and the second SAS storage device, continuously transmitting an initial frame between the first SAS storage device and the second SAS storage device; and
  establishing communication between the first SAS storage device and the second SAS storage device, in response to successful communication of the initial frame between the first SAS storage device and the second SAS storage device, to enable transmission of data between the first SAS storage device and the second SAS storage device utilizing the SAS protocol.

12. The non-transitory computer-readable medium claim 11, wherein the non-SAS data pattern comprises a pseudorandom bit sequence (PRBS) data pattern suitable for transmission over the optical cable.

13. The non-transitory computer-readable medium claim 11, wherein the initial frame comprises an SAS identify frame.

14. The non-transitory computer-readable medium claim 11, wherein the initial frame comprises a serial ATA (SATA) device-to-host frame information structure.

15. The non-transitory computer-readable medium claim 11, wherein the first SAS storage device is a master, and wherein successful exchange of the non-SAS data pattern comprises receipt, at the first SAS storage device, of the transmitted non-SAS data pattern.

16. The non-transitory computer-readable medium claim 11, wherein the first SAS storage device is a master, and wherein successful exchange of the non-SAS data pattern comprises expiry of a first timer.

17. The non-transitory computer-readable medium claim 11, wherein the first SAS storage device is a master and wherein successful exchange of the SAS data pattern comprises receipt, at the first SAS storage device, of the SAS data pattern.

18. The non-transitory computer-readable medium claim 11, wherein the first SAS storage device is a master and wherein successful exchange of the SAS data pattern comprises expiry of a second timer before.

19. The non-transitory computer-readable medium claim 11, wherein the second SAS storage device is a slave and successful exchange of the SAS data pattern comprises receipt, at the second SAS storage device, of the SAS data pattern.

20. The non-transitory computer-readable medium claim 11, wherein the second SAS storage device is a slave, and wherein successful communication comprises receipt, at the second SAS storage device, of a SAS identify frame.

* * * * *